United States Patent [19]

Jennings et al.

[11] 3,764,571
[45] Oct. 9, 1973

[54] ORGANOTIN STABILIZER SYSTEMS

[75] Inventors: Thomas C. Jennings, Lyndhurst; Charles W. Fletcher, Jr., East Cleveland, both of Ohio

[73] Assignee: Dart Industries, Inc., Los Angeles, Calif.

[22] Filed: Feb. 18, 1971

[21] Appl. No.: 116,671

[52] U.S. Cl. ........ 260/23 XA, 252/400, 260/45.7 R, 260/45.75 K
[51] Int. Cl. ........................................... C08f 45/54
[58] Field of Search ................ 252/400; 260/23 XA, 260/45.75 K, 45.7 R

[56] References Cited
UNITED STATES PATENTS

| | | | |
|---|---|---|---|
| 2,695,910 | 11/1954 | Asseff et al. | 260/413 |
| 3,067,151 | 12/1962 | Terry et al. | 260/2.5 |
| 2,617,049 | 11/1952 | Asseff et al. | 260/503 |
| 2,641,588 | 6/1953 | Leistner et al. | 260/45.75 |
| 3,446,765 | 5/1969 | Pryer | 260/23 |
| 2,641,596 | 6/1953 | Leistner et al. | 260/45.75 |
| 2,648,650 | 8/1953 | Weinberg et al. | 260/30.6 |
| 3,424,717 | 1/1969 | Gottlieb et al. | 260/45.75 |
| 2,883,363 | 4/1959 | Leistner et al. | 260/45.75 |
| 2,891,922 | 6/1959 | Johnson | 260/31.8 |
| 3,471,403 | 10/1969 | Le Suer et al. | 252/39 |
| 2,914,506 | 11/1959 | Mack et al. | 260/45.75 |
| 2,915,517 | 12/1959 | Le Suer | 260/139 |
| 3,478,071 | 11/1969 | Weisfeld | 260/429.7 |
| 2,954,363 | 9/1960 | Kuehne et al. | 260/45.75 |
| 2,959,551 | 11/1960 | Le Suer | 252/42.7 |
| 3,485,794 | 12/1969 | Gloskey | 260/45.75 |
| 2,968,642 | 1/1961 | Le Suer | 260/45.75 |
| 2,971,014 | 2/1961 | Mastin | 260/398 |
| 2,723,234 | 11/1955 | Asseff et al. | 252/32.7 |
| 2,726,254 | 12/1955 | Leistner et al. | 260/429 |
| 2,989,463 | 6/1961 | Mastin | 252/925 |
| 2,830,067 | 4/1958 | Ramsden et al. | 260/429.7 |
| 2,839,470 | 6/1958 | Warren et al. | 260/33 |
| 2,998,441 | 8/1961 | Mack et al. | 260/429.7 |
| 2,801,258 | 7/1957 | Johnson et al. | 260/429.7 |
| 2,809,956 | 10/1957 | Mack et al. | 260/45.75 |
| 3,001,981 | 9/1961 | Le Suer | 260/139 |
| 2,767,209 | 10/1956 | Asseff et al. | 260/504 |
| 2,777,874 | 1/1957 | Asseff et al. | 260/504 |
| 3,021,302 | 2/1962 | Frey et al. | 260/45.75 |
| 2,789,963 | 4/1957 | Hecker et al. | 260/45.75 |
| 2,798,852 | 7/1957 | Wiese et al. | 252/42.7 |
| 3,027,325 | 3/1962 | McMillen et al. | 252/33 |
| 2,855,417 | 10/1958 | Weinberg et al. | 260/429.7 |
| 3,069,447 | 12/1962 | Mack | 260/429.7 |
| 2,616,904 | 11/1952 | Asseff et al. | 260/399 |
| 2,616,905 | 11/1952 | Asseff et al. | 260/399 |
| 3,108,960 | 10/1933 | Le Suer | 252/32.7 |
| 2,616,906 | 11/1952 | Asseff et al. | 260/399 |
| 2,616,911 | 11/1952 | Asseff et al. | 260/413 |
| 3,126,400 | 3/1964 | Cramer et al. | 260/429.7 |
| 2,616,924 | 11/1952 | Asseff et al. | 260/504 |
| 2,616,925 | 11/1952 | Asseff et al. | 260/504 |
| 3,147,232 | 9/1964 | Norman et al. | 260/23 |
| 3,172,855 | 3/1965 | Rogers et al. | 252/32.7 |
| 3,194,823 | 7/1965 | Le Suer | 260/414 |
| 3,232,883 | 2/1966 | Le Suer | 252/32.5 |
| 3,242,079 | 3/1966 | McMillen | 252/33 |
| 3,242,080 | 3/1966 | Wiley et al. | 252/33 |
| 3,256,186 | 6/1966 | Greenwald | 252/33 |
| 3,274,135 | 9/1966 | Norma et al. | 260/23 |
| 3,293,273 | 12/1966 | Gloskey | 250/429.7 |
| 3,350,308 | 10/1967 | McMillen | 252/33 |
| 3,396,185 | 8/1968 | Hechenbleikner et al. | 260/429.7 |
| 3,413,264 | 11/1968 | Hechenbleikner et al. | 260/45.75 |
| 3,424,712 | 1/1969 | Gottlieb et al. | 260/45.75 |
| 2,870,119 | 1/1959 | Leistner | 260/45.75 |
| 2,870,182 | 1/1959 | Leistner et al. | 260/429.7 |
| 2,872,468 | 2/1959 | Leistner et al. | 260/429.7 |
| 2,883,340 | 4/1959 | Wasley et al. | 252/33 |

*Primary Examiner*—M. J. Welsh
*Assistant Examiner*—Eugene C. Rzucidlo
*Attorney*—Wood, Herron & Evans

[57] ABSTRACT

A novel composition which comprises:

a. an organotin sulfur-containing compound, for example, organotin mercaptides, organotin mercaptoacids, organotin mercaptoacid esters, organotin sulfides, organo thiostannoic acids and the like, b. an alkali or alkaline earth metal salt of an organic acid, such as Group I or Group II-a Periodic Table metal salts of aliphatic monocarboxylic acids, and c. an alkali or alkaline earth metal base such as 1) Group I or Group II-a Periodic Table metal oxides, hydroxides or carbonates and 2) organic over-based complexes of Group I or II-a metal bases.

These novel compositions have been found to extend the heat stability of vinyl halide resins in a remarkably effective manner even when used in total proportions and ratios of ingredients varying over a broad range.

18 Claims, No Drawings

ORGANOTIN STABILIZER SYSTEMS

BACKGROUND OF THE INVENTION

It is well-known in the art that organotin sulfur-containing compounds such as the organotin mercaptides are among the most efficient (by weight) heat stabilizers for vinyl halide resins. Many such organotin compounds are even now perhaps widely recognized as the best available single-compound stabilizers for polyvinyl chloride resins. Among the organotin sulf-containing compounds which have been proposed for the stabilization of polyvinyl chloride resins are organotin mercaptides, organotin mercaptoacids as described in U. S. Pat. Nos. 2,641,588; 2,648,650; 2,726,227; 2,726,254; 2,801,258, 2,870,119; 2,891,922; 2,914,506 and 2,954,363; the organotin mercaptoacid esters as described in U.S. Pat. No. 2,641,596; organotin esters of mercapto alcohols of U.S. Pat. Nos. 2,870,119; 2,870,182; 2,872,468 and 2,883,363; and organo thiostannoic acids such as butyl thiostannoic acid as disclosed in U.S. Pat. Nos. 3,021,302; 3,413,264; 3,424,712 and 3,424,717.

All of these organotin compounds have in common a sulfur-containing radical or atom attached to the tin through the sulfur atom and a hydrocarbon or substituted hydrocarbon group directly attached to the tin throuth a carbon atom. This combination of radicals has heretofore been recognized as giving optimum stabilization from the standpoint of clarity and heat stability. However, there are certain factors which have limited the use of organotin sulfur-containing compounds. Chief among these factors are their high cost. Also, sulfur-containing radicals introduce an odor problem. Further, these compounds also tend to impart poor light stability and plasticize rigid polyvinyl chloride (PVC) compositions.

Because of the mentioned drawbacks to the use of organotin sulfur-containing compounds, principally their cost, it has become advantageous for the vinyl halide resin formulator to process the resin with a minimum amount of organotin stabilizer and to seek out materials which will extend the heat stability of a given amount of the organotin stabilizer.

SUMMARY OF THE INVENTION

A novel composition has been discovered which displays an unpredicted three-fold synergism in the stabilization of vinyl halide resins and which allows for a most efficient utilization of organotin sulfur-containing stabilizers. The composition of our invention comprises (a) an organotin sulfur-containing compound, for example, organotin mercaptides, organotin mercaptoacids, organotin mercaptoacid esters, organotin sulfides, organo thiostannoic acids, mixtures thereof, and the like; (b) an alkali and/or alkaline earth metal salt of a carboxylic or thiocarboxylic acid, such as Group I or Group II—a Periodic Table metal salts of aliphatic monocarboxylic acids, and various mixtures of these metal salts, and (c) a base or mixtures of bases selected from the group consisting of (1) an alkali metal oxide, hydroxide or carbonate, (2) an alkaline earth metal oxide or hydroxide and (3) organic over-based complexes of an alkali or alkaline earth metal base.

The remarkable heat stabilizing efficiency of our stabilizer composition exists over a broad range of ratios of the three essential components; and the total three-component system in parts by weight can similarly vary over a wide range. The system of stabilizer components of this invention provides the vinyl halide formulator with premium stabilization at a substantially reduced cost. Heat stabilities have been achieved with the three-component novel compositions which are unobtainable at the same total levels of the individual components when used alone or in two-component combinations with one another. Moreover, inexpensive metal bases can be substituted for expensive organotin compounds in known systems with improved heat stability and reduction in objectionable odor.

The exact mechanism for the unexpected results in the stabilization of vinyl halide resins with our stabilizer composition is not completely understood. Certainly, there are theories which could be proposed, but regardless of theory the beneficial results evident in the numerous examples of this invention, in furtherview of their detailed description herein, speak for themselves. Applicants rely upon these empirical demonstrations of the principles of this invention to advance its merit.

In the three-component system of this invention, each of the components, namely, the organotin sulfur-containing compound, the alkali or alkaline earth metal carboxylate or thiocarboxylate and the base plays an important role. Without the organotin sulfur-containing compound, no commercially advantageous stabilization of vinyl halide resin systems is achieved. Moreover, it has been found that either the metal carboxylate or the base component, alone, contribute a very slight increase in the heat stabilization of vinyl halide resins in the presence of the organotin sulfur-containing compound. Quite unexpectedly, however, when both the metal carboxylate and base components are present with the organotin sulfur-containing component, an unpredicted synergism in heat stabilization exists which is of significant practical value and allows for the more efficient utilization of the organotin stabilizer in vinyl resin compositions.

This synergism of our three-component stabilizer system which has been found to exist, as mentioned, will vary over a broad range of both total parts by weight of the stabilizer system in the vinyl halide resin composition and the weight ratios of each of the three components with respect to another. Particularly, the stabilizer composition of this invention is useful over a total parts by weight range on the order of about 0.05 to about 10 parts by weight based upon 100 parts by weight (phr) of the vinyl halide resin. A most useful range of total parts by weight of stabilizer composition, however, is on the order of about 0.5 to about 3 phr. The reason for this is that only a minor amount within this lower range is normally required to achieve desired heat stability in the vinyl halide resin composition. The use of total amounts above about 3 parts by weight is principally governed by economies in most instances. Below about 0.5 total parts, the effectiveness of the composition will be reduced. It is presently preferred, for most purposes, that the three-component systems of this invention be employed on approximately equal parts by weight basis (i.e., 1:1:1 ratio), but synergiam has been demonstrated over this ratio as well as over broader ratios of ingredients. Therefore, ratios of components are not considered critically limiting upon the broader aspects of this invention.

ORGANOTIN SULFUR-CONTAINING COMPONENT

The organotin sulfur-containing compounds which are of use in this invention are generally characterized as having a sulfur-containing radical or atom attached to the tin through the sulfur atom and a hydrocarbon or substituted hydrocarbon group directly attached to the tin through a carbon atom, i.e., compounds containing the

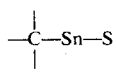

group. These compounds can also be characterized by the formula R-Sn-S wherein R represents a mono or polyvalent hydrocarbon or non-hydrocarbon substituted hydrocarbon radical. As mentioned, this combination of R-Sn-S bonds has been theretofore recognized as giving optimum stabilization. The tin bonds are usually derived from polyvalent tin by having at least one valence for bonding to the sulfur atom while the remaining valence or valences are for bonding with a hydrocarbon radical. Tin usually costs as a bi- or tetra-atom, but coordination complexes of tin are known where the tin behaves in even a high valence state and, therefore, the valence state of tin can vary in the organotin compounds which can be used in this invention.

Generally, however, most organotins suitable for use in this invention are derived from tetravalent tin. Of the types of organotin compounds contemplated, included are organotin mercaptides which may be characterized by the Formula I:

$$R_xSn(SR')_{4-x}$$

wherein R and R' represent hydrocarbon or substituted hydrocarbon radicals selected from the group consisting of alkyl, aryl, oxyalkyl, oxyaryl and the furfuryl and tetrahydrofurfuryl radicals, and x is an integral number from 1-3. Examples of such groups are alkyls such as methyl, ethyl, butyl, octyl, dodecyl, and octadecyl; aryls such as phenyl, tolyl, naphthyl or xylyl; oxyalkyl and oxyaryl, such as propyloxide, butyloxide, octyloxide, benzyloxide; and the furfuryl and tetrahydrofurfuryl groups. Specific examples of organotin mercaptides in which R and R' are butyl, for example, and x varies from 1 to 3 are monobutyltin tributylmercaptide, dibutyltin dibutylmercaptide and tributyltin monobutylmercaptide. Patents exemplifying this formula $R_xSn(SR')_{4-x}$ or a similar formula and a definition of compounds represented thereby include U.S. Pat. Nos. 2,641,588; 2,641,596; 2,648,650; 2,726,254 and 2,789,963, among others.

While the simplest representatives of the organotin sulfur-containing compounds are the organotin mercaptides of the Formula I, $R_xSn(SR')_{4-x}$, as stated herein above, the important components of the compounds are the organotin group and the tin-sulfur group. The organotins are therefore, not limited to the components of this formula, but are shown by all compounds in which a sulfur atom or mercapto radical is bound through the sulfur atom to the tin atom or the organotin radical, i.e., these organotins containing the R-Sn-S bonds. These compounds may be further defined by the Formula II:

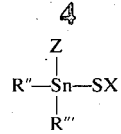

wherein R'', R''', SX and Z have the following significance: R'' and R''' may be different monovalent hydrocarbon radicals or substituted hydrocarbon radicals, but will be generally the same radicals because the starting materials for the preparation of the organotin mercapto compounds will be generally the di-(or tri-) hydrocarbon tin halides or oxides available in commerce. The nature of these groups has in most cases no, or only a very minor, influence on the properties of the end products. R'' and R''' may be aliphatic, aromatic, or alicyclic groups such as methyl, ethyl, propyl, butyl, amyl, hexyl, octyl, lauryl, allyl, benzyl, phenyl, tolyl, naphthyl and cyclohexyl, or substituted hydrocarbon groups of these groups having —OH, —NH$_2$, —CN, etc., radicals in the molecule such as cyanoethyl (of the type described in U. S. Pat. No. 3,471,538) and the like.

The group SX of Formula II, for instance, may be sulfur alone, the rest of a mercaptan, or a mercapto alcohol, or of an ester of a mercapto alcohol or mercapto acid. The patents mentioned above and in the background of this invention give examples of this. Aliphatic and aromatic mercaptans may be employed to form the group SX. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, phenoxyethoxyethyl mercaptan, and others. As examples of suitable mercapto alcohols, monothioethylene glycol, monothiopropylene glycol, thioglycerol, thiodiethylene glycol, and others may be mentioned. Particularly suitable are the esters of these mercapto alcohols in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapto acids, such as esters of beta thiopropionic acid, thiolactic acid, thiobutyric acid and mercapto lauric acid. It will be understood that the recited examples for group SX apply to SR' of Formula I and the examples of R'' or R''' apply to R or R' of Formula I.

The group Z of Formula II may be a monovalent hydrocarbon radical like R'' and R''', in which case the compound is a tri-hydrocarbon tin mercapto compound. The three hydrocarbon groups may have the same or different composition. Z may also be a sulfur alone or the rest of a mercapto compound linked through the S atom to the tin atom, in which case it may have the same composition as SX or a different composition. The former case represents a dihydrocarbon tin dimercapto compound and the latter case represents a mixed mercapto derivative of the dihydrocarbon stannanediol. In another sub-group, Z may be the rest of an alcohol or of a carboxylic acid linked through the oxygen of the alcoholic hydroxyl group or of the carboxylic acid group to the tin atom. Such compounds can be defined as monoesters or monoethers of hydrocarbon substituted stannanediol, in which the second hydroxyl group of the stannanediol is replaced by a mercapto compound. Thio alcohols and acids which are capable of forming such ether and ester groups are illustrated in the patents cited in the background of this invention along with their methods of preparation. Other specific references to organotin sulfur-containing compounds as widely described in the patent art include U. S. Pat. No. 2,641,588, col. 1, lines 32–53 to col. 2, lines 13–46; U. S. Pat. No. 2,641,596, col. 1, lines 10–44; U. S. Pat. No. 2,726,254, col. 1, line 63 to col. 2, line 19; U. S. Pat. No. 2,789,963, col. 2, lines 35–60; U. S. Pat. No. 2,914,506, col. 1, line 59 to col. 4, line 8; U. S. Pat. No. 2,870,119, col. 1, lines 27–53 and U. S. Pat. No. 3,126,400, col. 1, lines 21–61. Other patents exemplifying these organotin sulfur-containing compounds include U. S. Pat. Nos. 3,069,447; 3,478,071; 2,998,441; 2,809,956; 3,292,273; 3,396,185; 3,485,794; 2,830,067 and 2,855,417.

Other organotin sulfur-containing compounds which are within the scope of this invention are characterized by the following Formula III:

wherein R is defined as above, S is sulfur and $n$ is an integral number from about 2 to about 1000. These polymeric compounds are described in the patent literature, for example, at U. S. Pat. No. 3,021,302 at col. 1, line 60 to col. 2, line 17; U. S. Pat. No. 3,424,712 at col. 3, line 34 to col. 4, line 2; and U. S. Pat. No. 3,424,717 at col. 3, line 13, to col. 4, line 21. Specific reference is made to these patents at the referenced columns for more details. Other polymeric tin mercaptide type compounds having the R-Sn-S bonds characterizing the organotin sulfur-containing compounds suitable for use in this invention are exemplified in U. S. Pat. Nos. 2,809,956; 3,293,273; 3,396,185 and 3,485,794 and these exemplifications are incorporated herein by reference.

Of course, it is obvious that organotin mercaptides, organotin mercapto acids, organotin mercaptoacid esters, etc., per se form no part of this invention and the mentioned patents and their specific disclosures clearly teach these compounds and their method of production to enable anyone of ordinary skill to use them in carrying out this invention. Other literature references which are incorporated herein and which pertain to the organotin sulfur-containing component having the R-Sn-S group to exemplify the scope intended for this component in accord with the principles of this invention, include "The Development of The Organotin Stabilizers," by H. Verity Smith, Tin Research Institute, Greenford, Middlesex, Pp, 15–22, (December, 1959).

METAL SALT COMPONENT

The alkali or alkaline earth metal salts of carboxylic acids, including monocarboxylic as well as dicarboxylic acids, which are used in this invention are characterized by the formula IV:

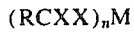

wherein the group RCXX is either the carboxylate or thiocarboxylate group of an aliphatic or aromatic mono or polyfunctional acid containing, for example, about $C_6 - C_{54}$ carbon atoms; R is a hydrocarbon or substituted hydrocarbon radical; X is oxygen or sulfur; n is an integral number from 1–2 and M is an alkali or alkaline earth metal, for example, sodium, potassium, magnesium, calcium, strontium and barium. The metals include Group I or Group II-a metals of the Periodic Table. These alkali or alkaline earth metal salts, or "carboxylates" as they are sometimes conveniently termed, have been widely developed in the art and are usually prepared by either a fusion or a double decomposition type reaction. In the direct fusion reaction, one equivalent of the organic acid is reacted with one equivalent of an alkaline or alkaline earth metal oxide or hydroxide at elevated temperatures. In the double decomposition reaction or precipitation reaction, the alkali salt or the sodium salt of the organo carboxylate is reacted with an equivalent amount of alkaline earth chloride or sulfate in aqueous media. Reference may be had to literature for methods of preparation and other examples of these organic acid salts such as S. B. Elliott, "The Alkaline Earth and Heavy Metal Soaps," Reinhold Publishing Co., N. Y., 1946; McGraw-Hill Encyclopedia of Science and Technology, p. 393, Vol. 12, 1960; "Fatty Acids and Their Derivatives", A. W. Ralston, Pp. 887–903, John Wiley & Sons, Inc., New York, 1948; "Fatty Acids and Their Industrial Applications", E. Scott Pattison, Pp. 209–220, Marcel Dekker, Inc., New York, 1968; "The Stabilization of Polyvinyl Chloride", Fernand Chevassus, Pp. 108–117, 137, St. Martin's Press, Inc., New York, 1968 and Mod. Chem., April-May, Pp. 1, 4, 6, 12 and 13. (1967).

The most useful metal salts of organic salts in accordance with the principles of this invention are those with lubricating characteristics such as the metal salts of fatty acids, more particularly, about $C_8-C_{24}$ monocarboxylic acids such as lauric and stearic acids; saponified synthetic fatty acids of about $C_{24}-C_{54}$ such as $C_{36}$ or $C_{54}$ dimer and trimer acids; and partially saponified ester waxes such as Hoeschst Wax OP which is an ester of montan wax partially saponified with calcium, e.g., $C_{28}-C_{32}$ carboxylic acids which are partially esterfied with a dihydric alcohol and then saponified with calcium to produce partially saponified ester waxes. However, although the lubricating metal salts are most useful, non-lubricating carboxylates such as benzoates or 2-ethyl hexoates are suitable and metallic thiocarboxylates show similar results.

The above cited literature references demonstrate that alkali and alkaline earth metal salts of carboxylic or thiocarboxylic acids and their methods of preparation have been widely developed in the art. Of course, these compounds per se as well as their methods of preparation form no part of this invention, and their employment in vinyl halide formulations as lubricating agents has heretofore been established. Specific examples of metal carboxylates for use in this invention include calcium stearate, calcium 2-ethyl hexoate, calcium octoate, calcium myristate, calcium palmitate, calcium laurate, barium laurate, barium stearate, magnesium stearate, calcium oleate, calcium ricinoleate, partially calcium saponified ester of montan wax, e.g., "Hoeschst Wax OP," identified above, and sodium stearate. Of course, combinations of the various cationic metals with the organic carboxylate groups can be employed such as barium/ magnesium carboxylates, barium/calcium carboxylates and the like of any of the mentioned carboxylate ions. Similarly, aromatic carboxylates of the phthalic, benzoic, naphthoic type where R is aryl, diaryl or substituted aryl may be employed such as calcium benzoate.

BASE COMPONENT

The base component broadly comprises either an alkali or alkaline earth (i.e., Group I and II-a) metal oxide, hydroxide, carbonate, bicarbonate, thicarbonate, sulfide, bisulfide, sulfite or bisulfite. It has been found that (a) an alkali metal oxide, hydroxide or carbonate and (b) an alkaline earth metal oxide or hydroxide can be used in the vinyl halide formulation in the presence of the organotin sulfur-containing compound and the metal carboxylate to provide the synergistic results. Alternatively, organic over-based complexes of an alkaline or alkali metal base such as Group I and II-a metal oxide, hydroxide, carbonate, bicarbonate, thiocarbonate, sulfide, bisulfide, sulfite or bisulfite will also provide the advantageous results of this invention. These organic over-based complexes, by reason of the organo group of the complex which tends to enhance their utility in various resin systems and by reason of their rather broadly diversified basic nature, are preferred for general applications in accord with this invention.

The alkali or alkaline earth metal bases which synergistically function include, for example $BaO$, $Ba(OH)_2$, $Ca(OH)_2$, and $Na_2CO_3$. Other metal bases such as $BaCO_3$, $CaCO_3$, have not been found to proide synergism when incorporated in the system as a dry crystalline material or commercial solid form. For example, it has been shown that calcium carbonate, in commercially available form having a mean particle size of about 0.6 micron when employed in a vinyl halide resin in the presence of an organotin sulfur-containing derivative along with a metallic carboxylate, exhibits no improvement in long-term heat stability when compared to such a vinyl halide resin formulation without such a commercial form of calcium carbonate. But, it has been discovered that an organic over-based or basic salt complex having reserve calcium carbonate combined in the complex will provide synergism in the presence of the other essential components of this invention. The main reason for this is attributed to the different chemical or physical state of the reserve calcium carbonate in the complex which alters its reactivity. Accordingly, alkali or alkaline earth metal oxide, hydroxide, carbonate, bicarbonate, thiocarbonate, sulfide, bisulfide, sulfite, and bisulfite in complex form are synergistically responsive in the presence of the organotin sulfur-containing compound and metal carboxylate components of the novel compositions of this invention.

The organic alkali or alkaline earth metal basic complexes of the type just referred to have been very well developed in the patent literature. They are commonly referred to as "organic alkali or alkaline earth basic metal complexes" or "basic salts" or "super-based salts." These terms are generic to well-known classes of metal-containing organic materials which have generally been employed as lubricant additives. Such over-based materials were commercialized principally by the Lubrizol Corporation and, therefore, are also commonly referred to in the trade as "Lubrizolates." The fundamental technique for preparing such over-based materials evolved in the preparation of a soap or salt of an organic acid where the use of an excessive amount of a neutralizing agent, such as a metal oxide or hydroxide, results in the formation of a stable product which contains an amount of metal in substantial excess of that which is theoretically required to replace the acidic hydrogens of the organic acid, e.g., a carboxylic or sulfonic acid, used as the starting material. Thus, if a monosulfonic acid, $$R-SO_3H$$

is neutralized with a basic metal compound, e.g., barium oxide, the "normal" metal salt produced will contain one equivalent of barium for each equivalent of acid, i.e., $$(R-SO_3)_2Ba$$

However, as is well-knon in the art, various processes are available for reacting one equivalent of an organic acid or an alkali or alkaline salt thereof (e.g., alkyl benzene sulfonic acid) with a stoichiometric excess, i.e., 2–10 equivalents of an alkaline earth inorganic base (e.g., barium oxide) in a suitable inert organic solvent to produce a basic complex in solution or dispersion form containing more than the stoichiometric amount of metal. Following these procedures, for example, an excess of 1 equivalent of barium oxide reacted with an organic sulfonic acid may be regarded as a double salt which is indicated by the structure, $$(R-SO_3)_2Ba \cdot BaO$$

Alternatively, this type of product may be regarded as a basic salt which is indicated by the structure, $$R-SO_3-Ba-OH$$

or a combination of these structures, $$R-SO_3-Ba-OH \cdot BaO$$

Regardless of whichever of these structures is accepted, it has been shown that such products contain metal in stoichiometrically larger amount than the organic acid radical and thus, the term "over-based" or "super-based" or "basic complex" is employed. The actual stoichiometric excess of metal can vary considerably, for example, from about 0.1 equivalent to about 30 or more equivalents depending on the reactions, the process conditions and the like. In the present specification and claims, the term "organic over-based complex" is used to designate materials containing a stoichiometric excess of metal and is, therefore, inclusive of those materials which have been referred to in the art as over-based, super-based, basic complex, etc. as discussed supra. Generally, the stoichiometric excess of metal for the organic over-based complexes is at least about 1 equivalent, as presently preferred, it being understood that the excess can vary from about 0.1 – 30 equivalents, even up to 60 or more equivalents.

Generally, most of these over-based organic complexes are prepared by treating a reaction mixture comprising the organic material to be over-based, a reaction medium of at least one inert organic solvent for the organic material, a stoichiometric excess of a metal base, and optionally a promoter. Also, the reaction product may optionally be treated with an acidic gas (e.g., $CO_2$) to reduce the free basicity of the complex. The free basicity is regarded as that amount of metal base which is titratible to a pH of about 8; whereas, the total basicity of the complex is titratible to a pH of about 3. The methods for preparing the over-based materials as well as an extremely diverse group of over-based materials are well known in the prior art as disclosed in the following U. S. patents.

| 2,616,904 | 2,616,905 | 2,616,906 | 2,616,911 | 2,616,924 |
| --- | --- | --- | --- | --- |
| 2,616,925 | 2,617,049 | 2,695,910 | 2,723,234 | 2,767,209 |
| 2,777,874 | 2,789,852 | 2,839,470 | 2,915,517 | 2,959,551 |
| 2,968,642 | 2,971,014 | 3,001,981 | 3,027,325 | 3,147,232 |
| 3,172,855 | 3,194,823 | 3,232,883 | 3,242,079 | 3,242,080 |
| 3,256,186 | 3,274,135 | 3,350,308 | | |

These patents disclose exemplary processes for synthesizing the over-based organic complexes used in the systems of the invention and are, accordingly, incorporated herein by reference for their discussion of these processes, materials which can be over-based, suitable metal bases, promoters and acidic materials, as well as a variety of specific over-based products.

Organic over-based complexes of metal bases useful in this invention may be represented by the following Formula V, it being understood that this formula is only representative of the actual over-based complexes which exist and their properties, since, as discussed above, various structural theories have been proposed and the precise structure of these organic complexes has not conclusively been established, nor is such necessary for the purposes of this invention.

Formula V $R_nM \cdot xM'A$ wherein R is an organic radical or residue of an organic material, including sulfonic or carboxylic acids or phenols; $n$ is 1–2; M and M' are the same or dissimilar alkali or aklaline earth metals of Group I and II-a of the Periodic Table; $x$ is a positive number greater than zero, preferably at least about 1 and usually in the range of about 1–30 or more; and A represents the anion portion of the basic metal compounds used in preparing the over-based complexes. The excess basicity is sometimes referred to in the art as "metal ratio" and these organic over-based complexes or salts have a metal ratio of at least about 1.1. The term "metal ratio" is used herein to designate the ratio of the total chemical equivalents of the metal in the salt to the chemical equivalents of the metal which is in the form of a normal salt, i.e., neutral salt of the organic fluid. To illustrate, a salt containing two equivalents of the metal per equivalent of the organic acid radical (i.e., R in the above formula) has a metal ratio of 2, whereas a neutral salt has a metal ratio of 1.

Organic materials which can be over-based are generally organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc., are disclosed along with methods of preparing over-based products therefrom in the above cited patents and are, accordingly, incorporated herein by reference. U.S. Pat. No. 2,777,874 identifies organic acids suitable for preparing over-based organic complexes which can be used in the compositions of the invention. Similarly, a number of the patents disclose a variety of organic acids, metal bases, etc., suitable for preparing organic over-based complexes as well as representative examples of over-based products prepared therefrom and these include: U.S. Pat. No. 2,695,910 at col. 2, line 27 to col 8, line 67; U.S. Pat. No. 3,194,823 at col. 3, line 40 to col. 6, line 44; U.S. Pat. No. 3,274,135 at col. 3, line 43 to col. 6, line 49; U.S. Pat. No. 3,350,308 at col. 1, line 45, to col. 11,line 75; U.S. Pat. No. 3,471,403 at col. 4, line 1 to col. 9, line 15; and U.S. Pat. Nos. 2,616,904, 2,767,209 and 3,147,232.

These patents and their disclosures are incorporated herein by reference. Over-based acids wherein the acid is a phosphorus acid, a thiophosphorus acid, phosphorus acid-sulfur acid combination, and sulfur acid prepared from polyolefins are disclosed in U.S. Pat. Nos. 2,883,340, 2,915,517, 3,001,981, 3,108,960 and 3,232,883. Over-based phenates are disclosed in U.S. Pat. No. 2,959,551 while over-based ketones are found in U.S. Pat. No. 2,798,852. A variety of over-based materials derived from oil-soluble metal-free, non-tautomeric neutral and basic organic polar compounds such as esters, amines, amides, alcohols, ethers, sulfides, sulfoxides, and the like are disclosed in U.S. Pat. Nos. 2,968,642, 2,971,014 and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be over-based. Other compounds suitable for over-basing are disclosed in the above cited patents or are otherwise well-known in the art.

A class of particularly suitable organic materials which may form the R group of Formula III above include oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids are discussed and identified in detail in the above-cited patents. Particularly, U.S. Pat. No. 2,616,904 and 2,777,874 disclose a variety of very suitable organic acids. For reasons of economy and performance, oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetropropylene-substituted glutaric acid, polyisobutene (M.W. — 5,000)-substituted succinic acid, polypropylene (M.W. — 10,000)-substituted succinic acid, octadecyl-substituted adipic acid, chlorostearic acid, 9-methylstearic, acid, dichlorostearic acid, stearylbenzoic acid, eicosane-substituted naphthoic acid, dilauryl-decahydronaphthalene carboxylic acid, didodecyl-tetralin carboxylic acid, dioctylcyclohexane carboxylic acid, mixtures of these acids, their alkali and alkaline earth metal salts and/or their anhydrides. Of the oil-soluble sulfonic acids, the mono-, di-, and tri-alphatic hydrocarbon substituted aryl sulfonic acids and the petroleum sulfonic acids (petro-sulfonic acids) are particularly suitable. Illustrative examples of suitable sulfonic acids include mahogany sulfonic acids, petroleum sulfonic acids, monoeicosane-substituted naphthalene sulfonic acids, dodecylbenzene sulfonic acids, petrolatum sulfonic acids, monoeicosane-subbenzene sulfonic acids, cetyl-chlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane sulfonic acid, lauryl-cyclo-hexanesulfonic acids, polyethylene (M.W. — 750) sulfonic acids, etc.

Within this group of over-based carboxylic and sulfonic acids, the barium and calcium over-based mono-, di-, and tri-alkylated benzene and naphthalene (including hydrogenated forms thereof) petrosulfonic acids, and higher fatty acids are especially suitable. Illustrative of the synthetically produced alkylated benene and naphthalene sulfonic acids are those containing alkyl substitutents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, diisononylbenzene sulfonic acid, di-isoocetadecylbenzene-sulfonic acid, stearyl-naphthalene sulfonic acid, and the like. The petroleum sulfonic acids are a well-known art recognized class of materials which have been used as starting materials in preparing over-based products since the inception of over-basing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids, including cycloalkyl sulfonic acids, and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This especially suitable group of aliphatic fatty acids includes the saturated and unsaturated higher fatty acids containing from 12 to about 30 carbon atoms. Illustrative of these acids are lauric acid, palmitic acid, oleic acid, linoleic acid, linolenic acid, oleo-stearic acid, stearic acid, myristic acid, and undecalinic acid, alpha-chlorostearic acid, and alpha-nitrolauric acid. The organic acids may contain non-hydrocarbon substituents such as halo, nitro, alkoxy, hydroxyl, and the like.

The over-based organic complexes used in the stabilizer systems of the invention usually contain from about 10 to about 70 percent by weight of metal-containing components. As explained, the exact nature of these metal containing components is not known. The material which is over-based may itself be a metal-containing compound, e.g., a carboxylic or sulfonic acid metal salt. Furthermore, the over-based organic complexes may be in colloidal non-newtonian form as disclosed and described in U. S. Pat. No. 3,384,586 in contrast to single phase homoegeneous systems. However, this depends upon the reaction conditions and the choice of reactants in preparing the over-based materials. Sometimes there is present in the product isoluble contaminants. These contaminants are normally unreacted basic materials such as calcium oxide, barium oxide, calcium hydroxide, barium hydroxode, or other metal base mateials used as a reactant in preparing the over-based material. It should be understood hovevrier, the the removal of these contaminants is not absolutely essential to the performance of this invention.

The metal compounds used in preparing the organic over-based complexes are the basic salts of metals in Group I and Group II-a of the Periodic Table. The anionic portion of the salt can be hydroxyl, oxide, carbonate, bicarbonate thiocarbonate, nitrate, sulfite, bisulfite, sulfide, bisulfide, halide amide, sulfate, etc., as disclosed in the above cited patents. The presently preferred over-based materials are prepared from the mentioned alkali and alkaline earth metal oxide, hydroxides, and carbonates.

As mentioned above, promoters (materials which permit the incorporation of the excess metal into the over-based material) may be used and are also quite diverse and well-known in the art as evidenced by the cited patents. A particularly comprehensive discussion of suitable promoters is found in U.S. Pat. Nos. 2,777,874; 2,695,910 and 2,616,904. These normally include the alcoholic and phenolic promoters. The alcoholic promoters include the alkanols of one to about 12 carbon atoms such as methanol, ethanol, amyl alcohol, octanol, isopropanol and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols and nonylphenols. Mixtures of various promoters are sometimes used.

Suitable acidic materials employed in the preparation of organic over-based complexes are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc. are ordinarily employed as the acidic materials. The most common acidic materials are carbon dioxide and acetic acid.

In view of the above comprehensive treatment of the metal carboxylate and the metal base components of the system of this invention, it will be appreciated that the metal carboxylate (or thiocarboxylate) and the metal base can be prepackaged or combined to form a complex containing the two essential components. For example, calcium stearate of the general formula type $(RCOO)_2Ca$ can be complexed with the basic metal hydroxide $Ca(OH)_2$ to form $(RCOO)_2Ca \cdot Ca(OH)_2$ which contains both essential components for combination with the organotin sulfur-containing component. It has been demonstrated that such pre-reacted components will still produce synergistic results in the resin systems.

The principles of this invention and its operating parameters will be further understood with reference to the following detailed examples which serve to illustrate the types of specific materials and their amounts as used in typical vinyl halide resin formulations and the synergisms displayed by the essential combination of the three stabilizer composition components of this invention. These examples are considered to be exemplary of this invention, and should not be considered as limiting, especially in view of applicants' broad disclosure of the principles of this invention.

In each of the first seven examples, a standard resin formula was employed when contained 100 parts by weight of polyvinyl chloride homopolymer which is characterized as a white powder having a particle size such that 100 percent passes through a 42 mesh screen and a specific gravity of 1.40 (Geon 103 EP by B. F.

Goodrich). Included in the standard resin formula is also 3 parts by weight of a processing aid which is an acrylic polymer in powdered form which improves the hot processing of rigid and plasticized vinyl compounds. (Acryloid K120N by Rohm and Haas Company). This material is a fine, white free flowing powder having a bulk density at about 0.30 grams per cc and a viscosity, 10 percent in toluene, at 600 cps (Brookfield). The processing aid merely facilitates hot processing and forms no part of this invention. Various organotin sulfur-containing derivatives and other ingredients were mixed into the standard resin formula on a parts by weight basis. These resin mixtures were then milled to form a uniform polyvinyl chloride composition for five minutes at 350° F. after which time the long term heat stabilities of test samples were determined by oven treatment at about 400°F. and ascertaining the number of minutes of heat treatment required for the samples to turn black. In all of the examples and tables which follow, all amounts of ingredients are in parts by weight unless otherwise indicated.

EXAMPLES 1-2

In Example 1, 2 parts of dibutyltin bis(isooctylthioglycolate), hereinafter in the Tables termed "DBT," was combined with one part of cetyl palmitate in the standard formula. Cetyl palmitate is a colorless waxy powder employed as a lubricant. In Example 2, 2 parts of dibutyltin bis(isooctylthioglycolate) with one part of calcium stearate was employed. Samples of each of these examples were milled and oven tested for heat stability, as indicated above. The results are reported in Table I.

TABLE I

| | Components | 400°F. Heat stability |
|---|---|---|
| Example 1 | 2 DBT<br>1 cetyl palmitate | 32' |
| Example 2 | 2 DBT<br>1 calcium stearate | 40' |

As Example 1 of Table I demonstrates, an organotin sulfur-containing compound, e.g., a dibutyltin mercaptoacid ester and a non-metal containing lubricant cetyl palmitate exhibited a heat stability of 32 minutes until blackening occurred. When the alkaline earth soap, i.e., calcium stearate was employed in the same amount as in Example 2, the heat stability was extended to about 40 minutes, or about eight minutes longer until blackening occurred. Therefore, Table I demonstrates that when an alkaline earth soap lubricant is employed with a dibutyltin mercaptoacid ester, some additional heat stability is achieved.

EXAMPLES 3-5

Three differnet vinyl halide resin compositions were then prepared by adding one part of dibutyltin bis (isooctylthioglycolate, i.e., (DBT), to the standard formula mentioned above (Example 3), one part each of DBT and calcium stearate (Example 4); and one part each of DBT and calcium hydroxide (Example 5). Each of these formulas were then milled and their heat stabilities determined by oven exposure at 400°F. as mentioned above. the results are shown in Table II.

TABLE II

| | Components | 400°F. Heat stability |
|---|---|---|
| Example 3 | 1 DBT | 15' |
| Example 4 | 1 DBT<br>1 calcium stearate | 20' |
| Example 5 | 1 DBT<br>1 calcium hydroxide | 20' |

The DBT when employed above blackened after about 15 minutes (Example 3). The combination of DBT and calcium stearate blackened after about 20 minutes of exposure (Example 4). Similarly, the combination of DBT and calcium hydroxide blackened after about 20 minutes exposure (Example 5). Thus, Table II demonstrates that calcium stearate as well as calcium hydroxide alone can marginally increase the heat stability of the organotin mercaptoacid ester.

EXAMPLES 6-7

The conditions and formulation of Example 4 were repeated except that in one instance 0.25 part of calcium hydroxide was added (Example 6) and in another instance one part by weight of clacium hydroxide was added (Example 7). The heat stability results are reported in Table III.

TABLE III

| | Components | 400°F. Heat stability |
|---|---|---|
| Example 6 | 1 DBT<br>1 calcium stearate<br>0.25 calcium hydroxide | 35' |
| Example 7 | 1 DBT<br>1 calcium stearate<br>1 calcium hydroxide | 40' |

Table III demonstrates that an addition of a small amount of a base of a group II-a metal hydroxide (e.g., calcium hydroxide) to a system containing an organotin mercaptoacid ester and an alkaline earth metal carboxylate increases the heat stability to an unexpected extent. Specifically, with 0.25 part of calcium hydroxide to the formula of Example 4, the heat stability is extended from 20 to 35 minutes. Moreover, the addition of one part of calcium hydroxide extended the heat stability of 40 minutes under the identical testing conditions. By comparison then of Example 6 and 7 with previous examples, it can be appreciated that the practical value of this discovery is that first it allows one to substantially reduce the organotin sulfur-containing ingredient level without a loss of long term heat stability. For example, with reference to a comparison of Examples 2 and 7, where one part of the calcium hydroxide was substituted for one part of the organotin mercaptide, the heat stability was maintained. Comparing Example 7 with examples 3-5, it is demonstrated that one part of DBT alne had a heat stability of about 15 minutes before blackening (Example 3) whereas, DBT and calcium stearate on an equal basis of one part by weight had a heat stability of about 20 minutes before blackening (Example 4); and similarly the DBT and calcium hydroxide on an equal basis of one part by weight had a heat stability of 20 minutes before blackening (Example 5). When, however, 0.25 part by weight of calcium hydroxide was added to the formula of Example 4, the heat stability was extended fifteen minutes (about 20 to 35 minutes) before blackening occurred and similarly, with the addition of one part of calcium hydroxide to the formula of Example 4, the heat stability was extended 20 minutes (20 minutes to about 40 minutes) before blackening. In summary, Examples 6-7 demonstrate that quite unexpectedly an organotin sulfur-containing compound and an alkaline earth metal carboxylate in the presence of a basic hydroxide of a Group II-a a metal displays a synergism which is unpredicted when compared to the use of that same organotin compound alone or in combination with either the alkaline earth metal carboxylate or the alkaline earth metal hydroxide.

EXAMPLES 8-10

To further demonstrate the advantageous aspects of this discovery and employing the principles of this invention, the level of the organotin compound was reduced by direct substitution with inexpensive inorganic metal bases with enhanced improvement of such long-term heat stability. In these examples, 8–10, the standard formula used in Examples 1–7 and the conditions of milling and oven treatment at 400°F. remained the same. Example 8 contained 1.5 parts DBT and 1 part of calcium stearate; Example 9 contained 1 part DBT and 1 part calcium stearate; and Example 10 contained 1 part DBT, 1 part calcium stearate and 0.5 part of calcium hydroxide. The results of the heat stabilities at 400°F. after time exposure of the samples to oven conditions are shown in Table IV.

TABLE IV

| | Components | 400°F. Heat Stability |
|---|---|---|
| Example 8 | 1.5 DBT<br>1.0 calcium stearate | 30' |
| Example 9 | 1.0 DBT<br>1.0 calcium stearate | 20' |
| Example 10 | 1.0 DBT<br>1.0 calcium stearate<br>0.5 calcium hydroxide | 35' |

Table IV demonstrates that the level of DBT can be reduced by the addition of rather inexpensive calcium hydroxide from 1.5 parts by weight to 1 part by weight with the addition of 0.5 part by weight of calcium hydroxide and yet the long-term heat stability of the composition was improved by extending the time to blacken by 5 minutes, (30 to about 35 minutes). This further substantiates the practical value of this discovery by demonstrating an enhanced heat stability when an inexpensive inorganic base is combined with the organotin sulfur-containing compound and an alkaline earth metal carboxylate. The organotin sulfur-containing compound was reduced in amount and yet, better long-term heat stability was achieved.

EXAMPLES 11-13

For the purpose of illustrating that other inexpensive inorganic metal bases will also function to extend the heat stability of an organotin sulfur-containing compound in the presence of an alkaline earth metal carboxylate, one part each of magnesium oxide, sodium carbonate and barium oxide were formulated under the conditions described in Examples 1–7 with the standard formula provided therein and subjected to heat treatment as also therein provided. The results of these heat stability tests appear in Table V.

TABLE V

| | Components | 400°F. Heat stability |
|---|---|---|
| Example 11 | 1 DBT<br>1 calcium stearate<br>1 magnesium oxide | 35' |
| Example 12 | 1 DBT<br>1 calcium stearate<br>1 sodium carbonate | 45' |
| Example 13 | 1 DBT<br>1 calcium stearate<br>1 barium oxide | 40' |

The heat stabilities of these compositions of Examples 11–13 as shown by Table V were 35, 45 and 40 minutes. respectively, before blackening occurred. By comparison of the results of Examples 11–13 with Examples 1–7, it has been demonstrated that magnesium oxide, sodium carbonate and barium oxide can be substituted for calcium hydroxide and similar advantageous results of enhanced heat stability, even with the reduction of organotin sulfur-containing compound, can be achieved.

As discussed in the detailed description of this invention, organic over-based complexes have been demonstrated by us to possess the desirable basic activity in our novel compositions. It has been explained that the exact physical or chemical structure of these compositions is not known except that, empirically, these compositions are stable and have reserved basicity by having associated therewith excess inorganic metal bases either in chemically combined form or in colloidal form. Regardless of the precise form of basicity, these organic complexes of metal bases such as lithium hydroxide, barium oxide, barium hydroxide, calcium oxide, calcium hydroxide, strontium hydroxide, etc. have been found to possess the desired properties for use in this invention. Several over-based complexes are commercially available from Lubrizol Corporation. Examples of these include "Lubrizol LD2106" which is an over-based barium phenate which features a high barium metal content in a liquid form. Typical properties of "Lubrizol LD 2106" are a specific gravity at 60°F. of 1.3; a Brookfield viscisoity at 77°F., 20 RPM, of 3000 cps.; a viscosity (SSU) at 210°F. of 95; a Gardner Color of 18+; and a percent weight barium content of 27.5 percent. Another typical of such basic metal complexes is a material sold by Lubrizol Corporation under the trademark "Lubrizol LD2103" which is an over-based barium carboxylate characterized by viscosity at 210° F. (SUS) of 78; color, ASTM of 4; sulfated ash of 40 percent; a weight of 10 lbs./gal. and a percent weight barium content of 23.5 percent. Other products of this type are commercially available, for example, Ba-190 by Bryton Chemical Company which is a basic barium organic sulfonate; "C-300" which is a highly basic oil soluble, calcium sulfonate having excess basicity of calcium carbonate and the like. Bryton "C-300" is 300 base numbered calcium sulfonate, the 300 designation being derived by the chemical base number of the composition which is approximately 295; and a typical analysis of such product demonstrates that it has a specific gravity at 60°F. of 1.13; a viscosity at 210°F. (SUS) of 800; a base number of 295; calcium in percent by weight of 11.8 percent; sulfur in percent by weight of 2.0 percent and sulfonate in percent by weight of 29 percent. These mentioned commercial products are widely available and are forms of basic organic complexes which have been described in detail herein and by reference to the patents cited. Indeed, they are not limiting upon the scope of this invention, but it is found convenient to employ some of them in examples which follow because of their availability as commodities of commerce.

To illustrate the typical preparation of organic over-based complexes and their advantageous use in this invention, Example 14–27 have been performed. In general, as compared to the previous examples of free basic materials such as calcium hydroxide, sodium carbonate, magnesium oxide and barium oxide of Example 1–13, these basic complexes are better adapted for uniform application of the principles of this invention since they have been found to insure compatibility of a large number of metal bases in the presence of the organotin sulfur-containing compound and metal carboxylate to achieve advantageous stabilization whree a particular free metal base's (e.g., CaCO₃) reactivity falls short of that required for synergism. The following Examples 14–17 will illustrate the typical preparation of alkaline earth metal organic complexes.

EXAMPLE 14

73.3 grams of nonylphenol (0.33 equivalent) and 76.7 grams of barium oxide (1.00 equivalent) were added to an agitated 250 ml beaker. A fluid paste resulted. To the paste dispersion, 9.0 grams of water (1.0 equivalent) were added. Upon the addition of the water, the temperature rose from ambient temperature to about 280°F. and the mass solidified. The solid material remaining was ground into a fine powder employing a Waring blender. The powder was characterized as a free-flowing beige powder which assayed at 40.5 percent barium. This product can be termed a barium nonylphenate basic complex and, if desired, its structure would be postulated according to the theories advanced in the description of this invention as attributed by prior art patents.

EXAMPLE 15

160.8 grams of nonylphenol (0.73 equivalent), 121.2 grams of toluene, 30.3 grams of isooctanol and 168.0 grams of BaO (2.19 equivalent) were added to a 14 one liter flask equipped with a Dean Stark trap and condenser, stirrer and thermometer. During the agitation of the mixture contained in the flask, 19.7 grams of water (2.19 equivalent) were added. The temperature rose from ambient temperature to about 210°F. on the addition of water. The mass was heated to reflux and 6.0 grams of water removed by azeotropic distillation. The resulting complex was a greenish black hazy liquid which assayed at about 27 percent barium. This product could be characterized in a manner similar to Example 14 as a barium nonylphenate basic complex.

EXAMPLE 16

One half of the barium basic metal complex from Example 15 was carbonated with CO₂ gas at reflux conditions for about 4 hours to reduce the titratible free basicity of the complex to phenophathalein indicator to 0. This technique, as mentioned in the description above, is used to reduce the free basicity of the complex. The resulting complex was a gray viscous opaque fluid which assayed at 27 percent barium and can be described as a basic barium nonylphenate-carbonate complex.

EXAMPLE 17

160.3 grams of nonylphenol (0.73 equivalent), 121.2 grams of hydrocarbon solvent, 30.3, grams of isooctanol and 168.0 grams of BaO (2.19 equivalents) were added to a 1 liter three-necked flask equipped with a Dean Stark water trap, condenser, thermometer and stirrer. 19.7 grams of water (2.19 equivalents) were added to the contents of the flask. Upon addition of water, the temperature of the mixture rose from ambient temperature to about 210°F. The mixture was heated to 300°F. and blown with CO₂ for about 4 hours to reduce the titratible basicity to phenophathalein to zero. During carbonation, 19 grams of water were collected. The product was cooled to 220°F. and filtered. The resulting basic complex was characterized as a clear dark viscous fluid which assayed at 25 percent barium by weight. This basic complex can be described as a barium nonylphenate-carbonate basic complex.

While these complexes of Examples 14–17 were prepared from substituted phenol starting materials, organic acids such as carboxylic and sulfonic acids can be used as illustrated by U. S. Pat. No. 2,616,905. Other organic compounds can be converted to basic Group I and Group II-a metal-containing complexes. For example, U. S. Pat. No. 2,989,463 illustrates the preparation of such complexes from alcohol, alkoxides, aminealdehyde condensation products and the like.

The following Examples 18–27 demonstrate by comparison the relative effectiveness of various organic basic metal complexes of the tye described in Examples 14–17 for extending the heat stability of an organotin sulfur-containing compound in the presence of an alkaline earth metal carboxylate. These examples also demonstrate the preferred effectiveness of the metal complexes in contrast to the free bases of the previous examples.

The following standard formulation was employed in Each of Examples 18–27.

100 parts polyvinyl chloride (Geon 103 EP identified above)

3 parts processing aid (K120N identified above)

1 part dibutyltin bis-(isooctylthioglycolate)

1 part calcium stearate

To this standard formula, in each of the Examples 19–27, a basic barium compound was introduced for comparison with one another against a standard blank of Example 18 where no barium was introduced. Each of the basic barium compounds of these examples were added to the standard formula on an equal barium basis of 0.27 parts of barium per hundred of resin. The conditions of processing of each example included the blending of the components and milling for 5 minutes at 350°F. The milling was followed by oven treatment at 375°F. to ascertain the long term heat stability of each sample by observing the time period in minutes before blackening occurred. The results appear in Table VI.

TABLE VI

| | Barium Introduced As | 375°F. Heat Stability |
|---|---|---|
| Example 18 | No barium introduced | 70' |
| Example 19 | BaO | 80' |
| Example 20 | Ba(OH)₂·H₂O | 90' |
| Example 21 | Basic barium complex of Example 14 | >100' |
| Example 22 | Basic barium complex of Example 15 | >100' |
| Example 23 | Basic barium complex of Example 16 | >100' |
| Example 24 | Basic barium complex of Example 17 | >100' |
| Example 25 | LD 2103* Basic barium complex | >100' |
| Example 26 | LD 2106* Overbased barium phenate | >100' |
| Example 27 | Ba 190+ Basic barium sulphonate | 100' |

* Produced by Lubrizol Corp., identified above.
+ Produced by Bryton Chemical Company, identified above.

Table VI demonstrates that the basic barium complexes of the Examples 14–17 and the commercially available Lubrizol and Bryton similar type complexes are more effective than an equal barium content introduced as a free barium oxide or barium hydroxide monohydrate. This is readily seen by an examination of Examples 19–27. In Examples 21–26, the basic barium complex had a heat stability greater than about 100 minutes. In contrast, the free barium oxide and barium hydroxide samples had heat stabilities of about 80 and 90 minutes, respectively. Accordingly, in a preferred form of the invention, the basic alkali or alkaline earth metal is furnished to the vinyl halide resin mixture along with the other essential ingredients of the stabilizer composition in the form of a basic complex. In such form, the heat extending stability is enhanced over the free base form.

EXAMPLES 28–38

In order to illustrate the advantageous effects of the stabilizer compositions according to this invention by employing various organotin sulfur-containing compounds, Examples 28–38 were performed as follows. The standard vinyl halide resin formulation contained 100 parts by weight of polyvinyl chloride (Geon 103 EP), 3 parts of processing aid (K120N) and 0.5 part of cetyl palmitate. To this standard formula, the stabilizer system on a parts by weight basis as identified in each of the Examples 28–38 below in Table VII were added, wherein (CaSt$_2$) stands for calcium stearate. The conditions of milling the ingredients were 5 minutes at 350°F. The heat stability of each of the vinyl halide resin stabilized examples was determined at 400°F. in the same manner as the above examples.

TABLE VII

| | Components | 400°F. Heat Stability |
|---|---|---|
| Example 28 | 1.0 dibutyltin bis(isooctyl-thioglycolate); 2.0 CaSt$_2$ | 35' |
| Example 29 | 1.0 dibutyltin bis(isooctyl-thioglycolate) 2.0 LD2106* | 35' |
| Example 30 | 1.0 dibutyltin bis(isooctyl-thioglycolate); 1.0 CaSt$_2$; 1.0 LD2106* | 50' |
| Example 31 | 1.0 monobutyltin tris(isooctyl-thioglycolate); 2.0 CaSt$_2$ | 27' |
| Example 32 | 1.0 monobutyltin tris(isooctyl-thioglycolate); 2.0 LD2106* | 27' |
| Example 33 | 1.0 monobutyltin tris(isooctyl-thioglycolate); 1.0 CaSt$_2$; 1.0 LD2106* | 40' |
| Example 34 | 1.0 dibutyltin dilaurylmercaptide; 2.0 CaSt$_2$ | 32' |
| Example 35 | 1.0 dibutyltin dilaurylmercaptide; 2.0 LD2106* | 25' |
| Example 36 | 1.0 dibutyltin dilaurylmercaptide; 1.0 CaSt$_2$; 1.0 LD2106* | 40' |
| Example 37 | 1.0 butyl thio-stannoic acid; 2.0 CaSt$_2$ | 20' |
| Example 38 | 1.0 butyl thio-stannoic acid; 1.0 CaSt$_2$; 1.0 LD2106* | 35' |

* Manufactured by Lubrizol Corp., as 2106* above.

Each of these sets of Examples 28–30, 31–33, 34–36, and 37–38 illustrates that various organtin sulfur-containing compounds of the organotin mercaptoacid ester type, e.g., dibutyltin bis(isooctylthioglycolate) and monobutyltin tris(isooctylthioglycolate) can be successfully employed with an alkali or alkaline earth metal carboxylate and an organic basic metal barium complex to achieve the advantageous results according to this invention. Moreover, an organotin sulfur-containing derivative such as an organotin mercaptide, e.g., dibutyltin dilaurylmercaptide and a polymeric organo thiostannoic acid, e.g., butyl thio-stannoic acid, can also be successfully employed. Reference to Examples 28–38 will also unequivocally show unexpected and unpredicted heat stabilities in the three-fold synergisms displayed with the additional advantage of substitution of a rather inexpensive basic ingredient for the organotin sulfur-containing compound as in the manner achieved in the previous examples. Table VII also demonstrates the broad scope of ingredients, particularly the various organotin sulfur-containing derivatives which do possess the extended heat stability characteristics of the stabilizer compositions according to this invention.

EXAMPLES 38–50

In order to demonstrate the utility of various alkali or alkaline earth metal carboxylates and to demonstrate the effect of different metal carboxylates as one of the essential ingredients of the three-fold stabilizer formulation of this invention, Examples 39–50 were performed employing different alkali and alkaline earth metal soaps, specifically, calcium stearate (CaSt$_2$), barium stearate (BaSt$_2$), strontium stearate (SrSt$_2$) and sodium stearate (NaSt). A standard formulation was employed containing 100 parts by weight of polyvinyl chloride (Geon 103EP), 3 parts by weight of processing aid (K120N), and 1 part by weight of cetyl palmitate. In each example, a stabilizer system containing the components as listed in the table in parts by weight for each example were prepared by milling and oven-testing as in Example 1. Each set of examples, namely 39–41, 42–44, 45–47 and 48–58 demonstrates that a variety of alkali or alkaline earth metal carboxylates can be used to obtain the advantages of this invention in combination with the organotin sulfur-containing compound and the organic over-based Group I or Group II-a metal complex. Moreover, each set of examples illustrates synergism for each of the meal carboxylates employed which further demonstrates the wide utility of the invention and its practical value of being able to substitute a number of metal carboxylates and still achieve the benefits of long-term heat stability, savings in cost and versatility in vinyl halide formulation variables. Formulation versatility is important to the formulators of vinyl halide resins who alter their formulas depending upon the particular application involved.

TABLE VIII

| | Components | 400°F. Heat Stability |
|---|---|---|
| Example 39 | 1.0 DBT; 2.0 CaSt$_2$ | 35' |
| Example 40 | 1.0 DBT; 2.0 LD2106* | 35' |
| Example 41 | 1.0 1.0 CaSt$_2$; 1.0 LD2106* | 50' |
| Example 42 | 1.0 DBT; 2.0 BaSt$_2$ | 35' |
| Example 43 | 1.0 DBT; 2.0 LD2106* | 35' |
| Example 44 | 1.0 DBT; 1.0 BaSt$_2$; 1.0 LD2106* | 50' |
| Example 45 | 1.0 DBT; 2.0 SrSt$_2$ | 30' |
| Example 46 | 1.0 DBT; 2.0 LD2106* | 35' |
| Example 47 | 1.0 DBT; 1.0 SrSt$_2$; 1.0 LD2106* | 45' |
| Example 48 | 1.0 DBT; 2.0 NaSt | 22' |
| Example 49 | 1.0 DBT; 2.0 LD2106* | 35' |
| Example 50 | 1.0 DBT; 1.0 NaSt; 1. LD2106* | 40' |

* Manufactured by Lubrizol Corp., identified supra.

It will also be observed in Table VIII that calcium, barium and strontium or the alkaline earth Group II-a metal type of metal carboxylate performs slightly better than the alkali sodium metal carboxylate.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride, of course. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C:CHCl$ to polyvinyl chloride $(CH_2-CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers; and the like. Of course, the vinyl halide commonly used in the industry is the chloride, although others such as bromide and fluoride may be used.

It is also to be understood that we are aware of prior art in which calcium carbonate has been used interchangeably with finely divided silica to permit a PVC composition to be compounded into high impact resistant products and which products may also contain dibutyltin mercapto ester and dibutyltin mercaptide as stabilizes along with calcium stearate as a lubricant. Such is exemplified by U. S. Pat. No. 3,407,171. However, calcium carbonate of the type which is commercially available and referred to as having a mean particle size of about 0.6 microns (as mentioned earlier herein) shows no improvement in heat stability over a composition which does not contain such a calcium carbonate. But significantly, as we have discovered, when an alkaline earth metal base exists in such a chemically active dispersed state as an organic overbased complex, remarkable heat stability results are achieved. Tests have demonstrated that heat stabilities can even be doubled when the basic inorganic Group I or Group II-a metal is provided in the form of a complex where it is believed to exist either in chemically combined form or in a fine state of subdivision on the order of about 50-200 A. such that synergism is achieved as has been demonstrated in the examples heretofore. It has also been demonstrated that calcium carbonate when it does exist in basic complex salt indeed offers significant advantages and unanticipated heat stability in accordance with the principles of this invention. To exemplify synergism displayed by calcium carbonate in its metal complex dispersed state, in contrast to a free base commercial powder on the order of about 0.6 microns in particle size shows no improvement over an identical system which does not contain such calcium carbonate, the fllowing examples have been performed.

EXAMPLES 51-53

The standard formula containing 100 parts by weight of polyvinyl chloride and 3 parts by weight of processing aid is compounded with the materials as specified in Table IX for each example in parts by weight. The milling as in previous examples, took place at 350°F. for about 5 minutes. Thereafter, the materials of each of the Examples 51-53 were oventested for heat stability at 400°F. as above and the results appear in Table IX as follows.

TABLE IX

| Example | Components | | 400°F. Heat Stability |
|---|---|---|---|
| Example 51 | 1.0 dibutyltin bis(iso octylthioglycolate) | 2.0 C-300* | 30' |
| Example 52 | 1.0 dibutyltin bis(iso-octylthioglycolate) | 2.0 barium stearate | 35' |
| Example 53 | 1.0 dibutyltin bis(iso-octylthioglycolate) | 1.0 C-300*; 1.0 barrium stearate | 50' |

* A highly basic oil soluble, calcium sulfonate containing calcium carbonate excess basicity, manufactured by Bryton Chemical Company, as identified above.

This table demonstrates that calcium carbonate contained in an organic basic metal complex indeed behaves in a synergistic manner in the presence of an organotin sulfur-containing compound and an alkaline earth metal carboxylate. As shown, the heat stability of the synergistic three-component stabilizer system was extended 15 minutes beyond that of either the alkaline earth metal carboxylate or the basic complex when employed alone.

EXAMPLES 54-58

The effect of various calcium carboxylates on the heat stability of an organotin sulfur-containing compound (DBT identified above) and an organic overbased complex (LD2106, identified above) was determined as follows. A standard formula containing 100 parts by weight of polyvinyl chloride, 3 parts by weight of processing aid (K120N identified above) and 0.25 parts of polyethylene A/C lubricant by Allied Chemical Corp. is compounded with the materials as specified in Table X for each example in parts by weight. The milling, as in previous examples, took place at 350°F. for about 5 minutes. Thereafter, samples of each of the Examples 54-58 were oven tested for heat stability at 400°F. as above and the results appear in Table X as follows.

TABLE X

| Example | Components | 400°F. Heat Stability |
|---|---|---|
| Example 54 | 1.0 DBT; 1.0 LD2106* | 30' |
| Example 55 | 1.0 DBT; 1.0 LD2106*; 1.0 OP Wax* | 35' |
| Example 56 | 1.0 DBT; 1.0 LD2106*; 1.0 Ca Stearate | 50' |
| Example 57 | 1.0 DBT; 1.0 LD2106*; 1.0 Ca Laurate | 50' |
| Example 58 | 1.0 DBT; 1.0 LD2106*; 1.0 Ca Benzoate | 40' |

* identified above

Table X demonstrates that various calcium carboxylates of the aliphatic monocarboxylic acid and the aromatic monocarboxylic type of about $C_6$ to about $C_{32}$ carbon atoms will provide the advantageous results according to this invention. Calcium slats of fatty acids, e.g., calcium stearate and calcium laurate, behave better because the minimum time to blackening at 400°F. was extended at least 10 minutes over calcium benzoate and OP Wax. Therefore, as mentioned in the description of this invention, the nonlubricating alkaline earth metal salts of aromatic carboxylic acids are suitable for use in this invention as well as the lubricating fatty acid salts. Similarly, the higher carbon atom containing carboxylic acid salts $C_{28} - C_{32}$ (OP Wax) are suitable.

EXAMPLES 59–62

As developed in the description of this invention, the metal salt component and the base component of this invention may be pre-mixed or pre-reacted to form a complex prior to their combination with the organotin sulfur-containing compound. Examples 59–62 demonstrate the effect of pre-reacting a metal carboxylate, e.g., calcium stearate with a metal base, e.g., calcium hydroxide, in comparison to calcium stearate and calcium hydroxide when employed alone. For this purpose, a standard formula of 100 parts of polyvinyl chloride and 3 parts of processing aid (K120N) is compounded with the materials as specified in Table XI for each exaple in parts by weight. The milling, as in previous examples, took place at 350°F. for about 5 minutes. Thereafter, the samples of each of the Examples 59–62 were oven tested for heat stability at 400°F. as above and the results appear in Table XI as follows.

The pre-reacted calcium stearate and calcium hydroxide, i.e., $St_2Ca \cdot Ca(OH)_2$, was prepared by charging 272 grams (1.0 equivalent) of commercial stearic acid (hydrogenated tallow fatty acid) to a 500 ml beaker and heating to 270°F. with agitation. Thereafter, 76.4 grams of 97 percent calcium hydroxide (2.0 equivalents) was added over 15 minutes at about 270° – 310°F. The reaction mixture was held for 20 minutes at about 310°F. to dehydrate the reaction mass. Theeafter, the mass was cooled whereupon it solidified. The mass was then ground to a powder. The product yield was about 330 grams and assayed at 12 percent calcium. The powdered product was employed in Table X, Example 61 as follows.

TABLE XI

| | Components | 400°F. Heat stability |
|---|---|---|
| Example 59 | 1.0 DBT | 20' |
| Example 60 | 1.0 DBT; 1.0 CaSt$_2$ | 25' |
| Example 61 | 1.0 DBT; 1.0 St$_2$Ca·Ca(OH)$_2$ | 30' |
| Example 62 | 1.0 DBT; 1.0 Ca(OH)$_2$ | 25' |

Examples 59–62 demonstrate that the complexed calcium stearate-calcium hydroxide on an equal parts by weight basis, when compared to the use of calcium stearate and calcium hydroxide alone, is better. It is to be observed that the complex contains about 0.5 molar parts each component and yet, the heat stability was improved.

The exact mechanism for the beneficial effects evident by the empirical examples, as mentioned above, is not completely understood nor do applicants wish to be held to any theory. Rather, with the numerous empirical examples demonstrated above, coupled with the detailed teachings of the organotin sulfur-containing compounds, the Group I and Group II-a metal carboxylates and the Group I and II-a metal bases, we have defined the best modes of our invention and it will become obvious to those of ordinary skill in this art that other equivalent materials can likewise be employed in view of our descriptions.

What is claimed is:

1. A resin stabilizer composition which consists essentially of, an organotin sulfur-containing compound having a

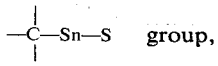  group, a metal salt selected from the group consisting of an alkali or alkaline earth metal salt of a carboxylic or thiocarboxylic acid, and mixtures thereof, and a base selected from the group consisting of a) an alkali metal oxide, hydroxide or carbonate, b) an alkaline earth metal oxide or hydroxide, and c) an organic over-based complex of an alkali or alkaline earth metal base, and mixture of said bases, said organotin, metal salt and base components in relative amounts which together provide a synergistic stabilizing effectiveness upon said resin.

2. The composition of claim 1 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

3. The composition of claim 1 wherein said metal salt is the carboxylic acid salt.

4. The composition of claim 3 wherein said acid is a fatty acid.

5. The composition of claim 1 wherein said acid contains about $C_6 - C_{54}$ carbon atoms.

6. The composition of claim 3 wherein said acid is an aliphatic monocarboxylic acid which contains about $C_8 - C_{32}$ carbon atoms.

7. The composition of claim 1 wherein said metal base of said organic complex is selected from the group consisting of an oxide, hydroxide, carbonate, bicarbonate, thiocarbonate, sulfide, bisulfide, sulfite or bisulfite and mixtures thereof.

8. The composition of claim 7 wherein said organic complex is derivable from the reaction of an acidic organic material selected from the group consisting of a carboxylic acid, thiocarboxylic acid, sulfonic acid, organic phosphorous acid, phenols, substituted phenols, and alkali or alkaline salts of such acids or phenols, and mixtures thereof, with a stoichiometric excess of said metal base.

9. A vinyl halide resin composition which comprises a vinyl halide resin and, as a heat stabilizer, an effective amount of a composition consisting essentially of, an organotin sulfur-containing compound having

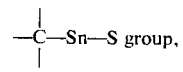 group, a metal salt selected form the group consisting of an alkali or alkaline earth metal salt of a carboxylic or thiocarboxylic acid, and mixtures thereof, and a base selected from the group consisting of a) an alkali metal oxide, hydroxide or carbonate, b) an alkaline earth metal oxide or hydroxide, and c) an organic over-based complex of an alkali or alkaline earth metal base, and mixtures of said bases, said organotin, metal salt and base components in relative amounts which together provide a synergistic stabilizing effectiveness upin said resin.

10. The composition of claim 9 wherein said organotin sulfur-containing compound is selected from the group consisting of an organotin mercaptide, organotin mercaptoacid, organotin mercaptoacid ester, organotin sulfide and organo thiostannoic acid, and mixtures thereof.

11. The compositin of claim 9 wherein said metal salt is the carboxylic acid salt.

12. The composition of claim 11 wherein said acid is a fatty acid.

13. The composition of claim 9 wherein said acid contains about $C_6 - C_{54}$ carbon atoms.

14. The composition of claim 9 wherein said metal base of said organic complex is selected from the group consisting of an oxide, hydroxide, carbonate, bicarbonate, thiocarbonate, sulfide, bisulfide, sulfite, or bisulfite and mixtures thereof.

15. The composition of claim 14 wherein said organic complex is derivable from the reaction of an acidic organic material selected from the group consisting of a carboxylic acid, thiocarboxylic acid, sulfonic acid, organic phosphorous acid, phenols, substituted phenols, and alkali or alkaline salts of such acids or phenols, and mixtures thereof, with a stoichiometric excess of said metal base.

16. The composition of claim 1 wherein said components are present in an approximate ratio of 1:1:1.

17. The composition of claim 9 wherein said effective amount is on the order of about 0.5 to about 3 parts by weight per 100 parts resin and the relative amounts are present in an approximate ratio of 1:1:1.

18. The composition of claim 9 wherein said effective amount is on the order of 0.05 to about 10 parts by weight per 100 parts resin.

* * * * *

UNITED STATES PATENT OFFICE
CERTIFICATE OF CORRECTION

Patent No. 3,764,571                     Dated October 9, 1973

Inventor(s) Thomas C. Jennings and Charles W. Fletcher, Jr.

It is certified that error appears in the above-identified patent and that said Letters Patent are hereby corrected as shown below:

| | | | |
|---|---|---|---|
| Col. 1 | Line 10 | "sulf-" | should be --sulfur-- |
| Col. 1 | Line 27 | "throuth" | should be --through-- |
| Col. 2 | Line 64 | "synergiam" | should be --synergism-- |
| Col. 3 | Line 21 | "theretofore" | should be --heretofore-- |
| Col. 3 | Line 26 | "costs" | should be --acts-- |
| Col. 3 | Lines 26 and 27 | "bi or tetra atom" | should be --bi or tetra valent atom-- |
| Col. 3 | Line 28 | "high" | should be --higher-- |
| Col. 3 | Line 66 | "these" | should be --those-- |
| Col. 5 | Line 69 | "$C_6-c_{54}$" | should be --$C_6-C_{54}$-- |
| Col. 6 | Line 31 | "organic salts" | should be --organic acids-- |
| Col. 7 | Line 4 | "thicarbonate" | should be --thiocarbonate-- |
| Col. 7 | Line 24 | "proide" | should be --provide-- |
| Col. 8 | Line 13 | "well-knon" | should be --well known-- |
| Col. 9 | Line 39 | "organic fluid" | should be --organic acid-- |
| Col. 11 | Line 6 | "benene" | should be --benzene-- |

Column 8, line 41, "upwardly" should be --- outwardly ---.

Column 8, line 54, "an" should be --- and ---.

Column 8, line 65, "th" should be --- the ---.

Column 9, line 48, "an" should be --- and ---.

Column 9, line 56, "entirely" should be --- entirety ---.

Column 9, line 66, "cas" should be --- cans ---.

Column 10, line 22, "th" should be --- the ---.

Column 10, line 24, "carries" should be --- actuates ---.

Column 10, line 34, "355" should be --- 344 ---.

Column 11, line 12, "bout" should be --- about ---.

Column 11, line 12, "64" should be --- 65 ---.

Column 11, line 16, "nd" should be --- and ---.

Column 11, line 18, "uter" should be --- outer ---.

Column 11, line 39, "th" should be --- the ---.

Column 12, line 24, "achine" should be --- machine ---.

Column 13, line 12, "adjustmennt" should be --- adjustments---.

Column 13, line 17, "elt" should be --- belt ---.

Column 13, line 19, "cns" should be --- cans ---.

Column 13, line 67, "transmition" should be --- transition ---.

Column 14, line 2, "transmistion" should be --- transition ---.

Column 14, line 12, "innersmot" should be --- innermost ---.

Column 14, line 32, "b nsreased" should be --- be increased ---

Column 16, line 3, "sapced" should be --- spaced ---.

Column 17, line 12, "trains" should be --- trained ---.

Column 17, line 50, "cooperatinj" should be --- cooperating ---.

Column 18, line 11, "measpositioned" should be --- means positioned ---.

Column 18, line 42, "selectivelyy" should be ---- selectively ---.

Column 18, line 55, "he" should be --- the ---.

Column 19, line 5, "off" should be --- of ---.

Column 19, lines 6-8, "free upper edges of said web as it is withdrawn from said holding means" should be omitted.

Column 19, line 25, "aa" should be --- a ---.

Column 19, line 49, "downstrea" should be --- downstream ---.

Column 19, line 57, "aa" should be --- a ---.

Column 19, line 67, "witl" should be --- with ---.

Column 20, line 24, "e" should be --- be ---.

Column 20, line 56, "dges" should be --- edges ---.

Column 20, line 64, "spaced" should be --- spread ---.

Signed and sealed this 9th day of July 1974.

(SEAL)
Attest:

McCOY M.GIBSON,JR.
Attesting Officer

C. MARSHALL DANN
Commissioner of Patents

UNITED STATES PATENT OFFICE
CERTIFICATE OF CORRECTION

Patent No. 3,764,571  Dated October 9, 1973

Inventor(s) Thomas C. Jennings and Charles W. Fletcher, Jr.

It is certified that error appears in the above-identified patent and that said Letters Patent are hereby corrected as shown below:

| | | | |
|---|---|---|---|
| Col. 1 | Line 10 | "sulf-" | should be --sulfur-- |
| Col. 1 | Line 27 | "throuth" | should be --through-- |
| Col. 2 | Line 64 | "synergiam" | should be --synergism-- |
| Col. 3 | Line 21 | "theretofore" | should be --heretofore-- |
| Col. 3 | Line 26 | "costs" | should be --acts-- |
| Col. 3 | Lines 26 and 27 | "bi or tetra atom" | should be --bi or tetra valent atom-- |
| Col. 3 | Line 28 | "high" | should be --higher-- |
| Col. 3 | Line 66 | "these" | should be --those-- |
| Col. 5 | Line 69 | "$C_6$-c54" | should be --$C_6$-$C_{54}$-- |
| Col. 6 | Line 31 | "organic salts" | should be --organic acids-- |
| Col. 7 | Line 4 | "thicarbonate" | should be --thiocarbonate-- |
| Col. 7 | Line 24 | "proide" | should be --provide-- |
| Col. 8 | Line 13 | "well-knon" | should be --well known-- |
| Col. 9 | Line 39 | "organic fluid" | should be --organic acid-- |
| Col. 11 | Line 6 | "benene" | should be --benzene-- |

UNITED STATES PATENT OFFICE
CERTIFICATE OF CORRECTION

Patent No. 3,764,571        Dated October 9, 1973

Inventor(s) Thomas C. Jennings and Charles W. Fletcher, Jr.

It is certified that error appears in the above-identified patent and that said Letters Patent are hereby corrected as shown below:

| | | | | | |
|---|---|---|---|---|---|
| Col. 11 | Line 8 | "substitutents" | should be | --substituents-- |
| Col. 11 | Line 54 | "non-newtonian" | should be | --non-Newtonian-- |
| Col. 11 | Line 56 | "homoegeneous" | should be | --homogeneous-- |
| Col. 11 | Line 59 | "isoluble" | should be | --insoluble-- |
| Col. 11 | Line 62 | "hydroxode" | should be | --hydroxide-- |
| Col. 11 | Line 63 | "mateials" | should be | --materials-- |
| Col. 11 | Line 64 | "howevrer" | should be | --however-- |
| Col. 11 | Line 65 | "the the removal" | should be | --that the removal-- |
| Col. 12 | Line 64 | "when" | should be | --which-- |
| Col. 13 | Line 56 | "differnet" | should be | --different-- |
| Col. 14 | Line 41 | "of" | should be | --to-- |
| Col. 14 | Line 19 | "clacium" | should be | --calcium-- |
| Col. 14 | Line 52 | "alne" | should be | --alone-- |
| Col. 15 | Line 2 | "II-a a metal" | should be | --II-a metal-- |
| Col. 16 | Line 33 | "viscisoity" | should be | --viscosity-- |

UNITED STATES PATENT OFFICE
CERTIFICATE OF CORRECTION

Patent No. 3,764,571      Dated October 9, 1973

Inventor(s) Thomas C. Jennings and Charles W. Fletcher, Jr.

It is certified that error appears in the above-identified patent and that said Letters Patent are hereby corrected as shown below:

| | | | |
|---|---|---|---|
| ol. 17 | Line 7 | "whree" | should be --where-- |
| ol. 17 | Line 26 | "would" | should be --could-- |
| ol. 17 | Lines 33 and 34 | "14 one liter flask" | should be --three-necked one liter flask-- |
| ol. 18 | Line 20 | "tye" | should be --type-- |
| ol. 19 | Line 57 | "as 2106* above" | should be --as identified above-- |
| ol. 20 | Line 15 | "EXAMPLES 38-50" | should be --EXAMPLES 39-50-- |
| ol. 20 | Line 33 | "48 - 58" | should be --48-50-- |
| ol. 20 | Line 39 | "meal" | should be --metal-- |
| ol. 20 | Line 53 | "1.0 1.0CaSt$_2$" | should be --1.0DBT; 1.0CaSt$_2$ |
| ol. 21 | Line 30 | "stabilizes" | should be --stabilizers-- |
| ol. 21 | Line 56 | "size shows" | should be --size which shows-- |
| ol. 21 | Line 58 | "fllowing" | should be --following-- |
| ol. 22 | Line 13 | "barrium" | should be --barium-- |

UNITED STATES PATENT OFFICE
CERTIFICATE OF CORRECTION

Patent No. 3,764,571    Dated October 9, 1973

Inventor(s) Thomas C. Jennings and Charles W. Fletcher, Jr.

It is certified that error appears in the above-identified patent and that said Letters Patent are hereby corrected as shown below:

Col. 22  Line 61  "slats"        should be --salts--

Col. 23  Line 19  "exaple"       should be --example--

Col. 24  Line 53  "form"         should be --from--

Col. 24  Line 63  "upin"         should be --upon--

Col. 25  Line  1  "compositin"   should be --composition--

This certificate supersedes Certificate of Correction issued July 9, 1974.

Signed and Sealed this

Seventh Day of September 1982

[SEAL]

Attest:

GERALD J. MOSSINGHOFF

Attesting Officer    Commissioner of Patents and Trademarks